US006394356B1

(12) United States Patent
Zagami

(10) Patent No.: US 6,394,356 B1
(45) Date of Patent: May 28, 2002

(54) ACCESS CONTROL SYSTEM

(75) Inventor: Anthony Zagami, Jupiter, FL (US)

(73) Assignee: Security Identification Systems Corp., West Palm Beach, FL (US)

( * ) Notice: Subject to any disclaimer, the term of this patent is extended or adjusted under 35 U.S.C. 154(b) by 0 days.

(21) Appl. No.: 09/872,395

(22) Filed: Jun. 4, 2001

(51) Int. Cl.$^7$ .......... G06K 19/00
(52) U.S. Cl. .......... 235/487; 235/382
(58) Field of Search .......... 235/487, 382

(56) References Cited

U.S. PATENT DOCUMENTS 5,180,906 A * 1/1993 Yamada .......... 235/487

FOREIGN PATENT DOCUMENTS

JP 63-120696 * 5/1988

* cited by examiner

*Primary Examiner*—Harold I. Pitts
(74) *Attorney, Agent, or Firm*—McHale & Slavin

(57) ABSTRACT

An access control system for monitoring human ingress and egress comprises an input means for creating a unique identifier for to be stored in a database. The unique identifier includes a digital image of the person, a digital image of the unique identifier, and alphanumeric identification data. A processing means coupled to said input means is operable to perform the steps of storing the unique identifier as a computer-readable file in the database, recording the arrival date and time of a person; creating a tracking record associated with the unique identifier. The unique identifier can be displayed on a monitor coupled to the processing means. A printer coupled to the processing means generates an access pass on portable media which includes a viewable image of the person and the identification document, and alphanumeric identification data for the person. The access pass can also include machine readable media which comprises a coded representation of the unique identifier. The system of the invention can include a sensing mechanism operable to interpret the machine-readable media. Access permission designators can be associated with the unique identifier in the database to approve or deny access, or to grant selective access.

52 Claims, 4 Drawing Sheets

ACCESS CONTROL SYSTEM

FIELD OF THE INVENTION

This invention relates generally to the field of access control systems, and more specifically to a system and apparatus for issuing access passes and maintaining a database of identification information for monitoring and controlling ingress and egress in a restricted facility.

BACKGROUND OF THE INVENTION

For security reasons, public access to restricted facilities such as military installations, police stations, correctional institutions and governmental offices is tightly controlled. The need for controlled access exists in private industry as well, as in, for example, corporate facilities and plants which must maintain strict control of visitor and non-employee traffic. In addition to known employees and personnel, persons seeking entry to a facility can include vendors, maintenance workers, delivery services, and others having business within the facility. In order for a facility to function efficiently, there is a need to provide access to those seeking entry without undue delays, while at the same time maintaining security.

Access control for visitors and personnel is typically implemented with a human attendant stationed at a point of entry. A basic method of access control involves maintaining a manual log book where a visitor's name and other relevant particulars are recorded. Since a "by hand" system has limited functionality, it is far more desirable to maintain a computerized database of visitor and personnel information. In this way, it is possible to obtain an rapid and accurate accounting of visitor and personnel activity at any given time. A computerized visitor database also facilitates allowing only conditional access to certain individuals, or denying access altogether to an individual.

It is often necessary, particularly in the case of police stations and correctional facilities, to accurately document the identity of an individual seeking entry. Visitors to a facility may be given a temporary badge or pass identifying them being authorized for access. A pass or badge allows for rapid visual verification that a person is permitted to enter a given area. In order to prevent misuse of a badge or pass, it would be beneficial to include a photograph of the person on the pass itself so that it cannot be transferred to another. However, having one's photograph taken can seem unnecessarily intrusive as many people feel that the presence of the camera is unpleasant and intimidating.

In some environments, it may be desired that an access control system be as transparent and unobtrusive as possible so that activity can be monitored without creating an unpleasant "under surveillance" atmosphere. To this end, the present invention provides a system and apparatus for quickly collecting and processing identification data from a person, including a surreptitious photograph, in order to issue a visitor pass and grant access.

The need for secure access control is particularly evident in the case of police stations. Allowing visitors to flow freely in and out of a police station is highly undesirable. A manual log book can be maintained, however for a police station certain types of visitor traffic can make it beneficial to rapidly obtain background information for a visitor. For security reasons, it would also be advantageous to provide a computer implemented access control system which can be integrated with access control devices such metal detectors, doors, locking mechanisms, portals, turnstiles, and biometric devices. Further, the ability to expedite a repeat visitor is desirable. For instance, an attorney visiting a prisoner may repeat visits daily for weeks. The ability to rapidly process such a repeat visitor is highly beneficial.

SUMMARY OF THE INVENTION

It is an objective of the invention to provide a system and method for access control which processes identification data and issues a visitor pass on portable media which includes an image of the visitor combined with an image of the identification document.

It is another objective of the invention to provide system and method for access control which utilizes at least one camera operable to record a digital image of a person and a digital image of an identification document.

It is a further objective of the invention to provided a system and method for access control which utilizes an autofocus camera which is preferably partially concealed from view so that a digital image of the person can be recorded unobtrusively, the autofocus camera operable to record a image of a person in a first plane of focus and an image of the indemnification document in a second plane of focus.

It is yet another objective of the invention to provide system and method for access control which maintains a database of visitor identification data.

It is still a further objective of the invention to provide system and method for access control which maintains tracking records for a visitor.

It is yet a further objective of the invention to provide system and method for access control which has the capacity to produce reports documenting visitor activity.

It is still a further objective of the invention to provide system and method for access control which maintains tracking records for a visitor.

It is still another objective of the invention to provide system and method for access control which can deny entry to unwanted visitors.

In accordance with the above objectives, an access control system for monitoring human ingress and egress comprises an input means for creating a unique identifier for a person including a digital imaging unit operable to record a digital images of a person and their identification documents and a means for inputting alphanumeric identification data associated with the person, wherein the combination of the digital images of the person and identification documents and alphanumeric identification data form the unique identifier; a database; a processing means coupled to the input means, timekeeping means operable to record chronological parameters; an electronic display coupled to the processing means operable to display the unique identifier; printing means; and an access pass on portable media which includes a viewable image of the person and alphanumeric identification data for the person. The access pass can further include a viewable image of the identification document, the arrival date and time, and machine-readable media which comprises a coded representation of the unique identifier. The access pass can be a card or an adhesive-backed badge worn on the person.

The digital imaging unit can include at least one camera. The camera can comprise an autofocus camera operable to record a digital image of a person in a first plane of focus and a digital image of the identification document for the person in a second plane of focus. The autofocus ca includes a planar surface for receiving the identification document to be recorded wherein said planar surface is coincident with said second plane of focus.

The processing means is operable to perform the steps of storing the unique identifier as a computer-readable file in the database, recording the arrival date and time of a person; creating a tracking record associated with said unique identifier wherein said tracking record includes the chronological parameters. The tracking record can further include the internal destination of the person.

The database further comprises a listing of a plurality predetermined internal destinations within the facility, wherein at least one of said internal destinations are specified by the person at the time of ingress. An authorization means is preferably coupled to the processing means, wherein the authorization means is operable to issue the access pass at the point of ingress after obtaining positive authorization. The authorization means can be operable to obtain authorization from the specified internal destination.

The processing means is operable to perform the steps of storing an access permission designator in the database in association with the unique identifier and querying the database to retrieve the access permission designator. In the event the access permission designator is positive, and the processing means is operable to issue the access pass. In the event the access permission designator is negative, access is denied. The access permission designator can permit selective access to at least one internal destination.

The access pass can further include machine-readable media comprising a coded representation of the unique identifier. The machine-readable media can comprise the computer-readable file corresponding to said unique identifier. The machine-readable media can also comprise a token file associated with the unique identifier in the database. The access control system of the present invention can further comprise at least one sensing mechanism coupled to the processing means operable to interpret the machine-readable media. A sensing mechanism can be located at point of exit from the facility in order to record the time of exit. The machine-readable media can be a machine readable indicia, such as a bar code, or a magnetic strip.

DETAILED DESCRIPTION OF THE INVENTION

Although the invention will be described in terms of a specific embodiment, it will be readily apparent to those skilled in this art that various modifications, rearrangements, and substitutions can be made without departing from the spirit of the invention. The scope of the invention is defined by the claims appended hereto.

The access control system of the present invention monitors human ingress and egress by processing identification data and documents, capturing and storing digital images of visitors and their identification documents, and issuing an access pass for authorized visitor and other personnel. The system of the present invention creates a unique identifier for a person at a point of entry. The unique identifier preferably includes a digital image of the person seeking entry, a digital image of an identification document, such as a driver's license, and alphanumeric identification data consisting of the individual's name, company affiliation, etc. The unique identifier is stored in binary form in a database.

Figure 1:
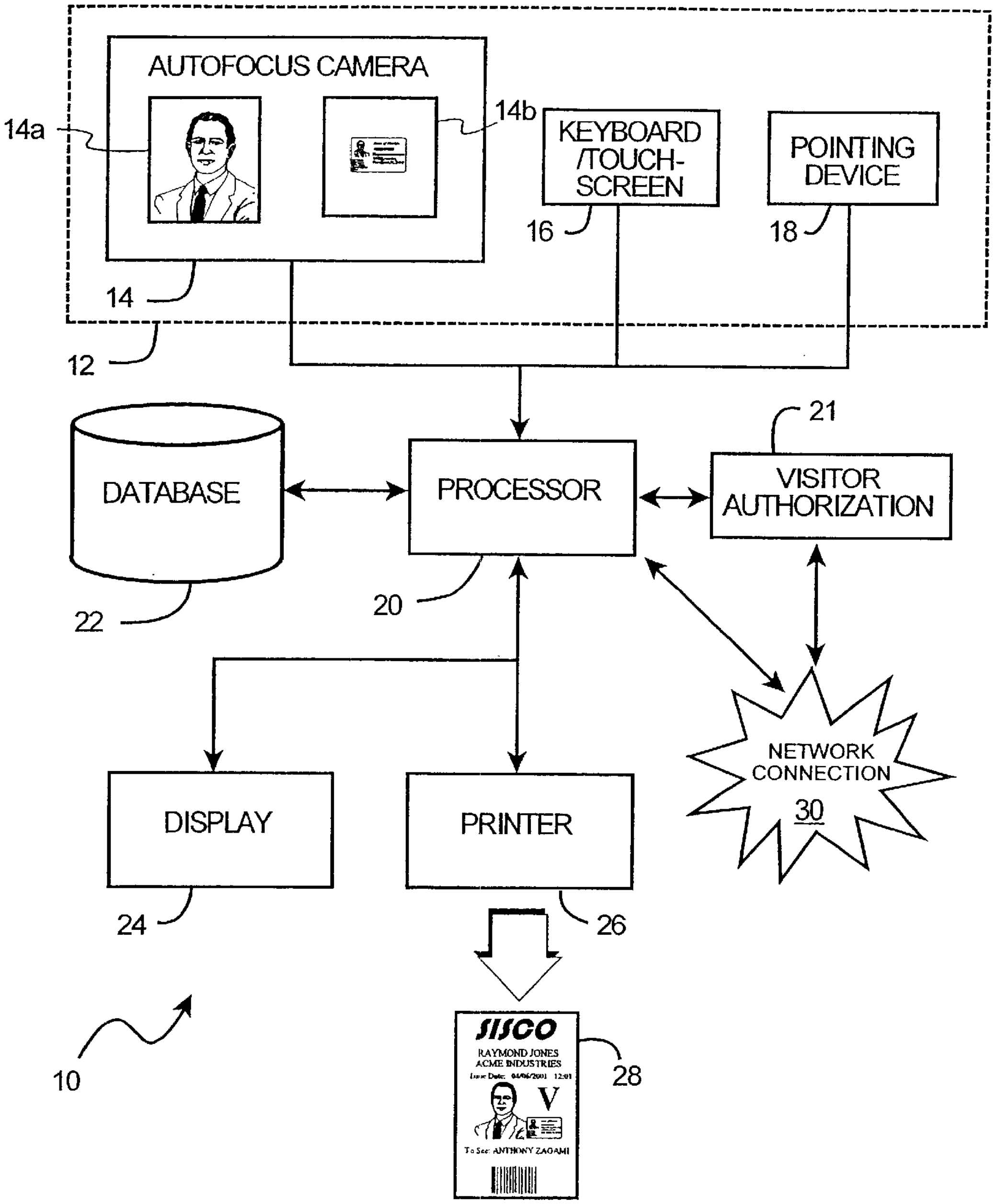
FIG. 1 is a schematic illustration of an entry station for an access control system according to a preferred embodiment of the invention.

FIG. 1 schematically illustrates the elements of an entry station 10 which would be preferably located at a point of entry in an access control system according to a preferred embodiment. To create a unique identifier for a person seeking entry, personal data for an individual seeking access is entered via input means 12. The input means 12 preferably includes a digital imaging unit 14, a keyboard and/or touchscreen 16 for the entry of alphanumeric data, and a pointing device 18. As will be explained in detail hereinafter, the digital imaging unit 14 is operable to record a digital image of a person 14*a* and a digital image of an identification document for the person 14*b*. The input means 12 can include a magnetic strip reader 17 which can input machine-readable identification data from a magnetic strip on an identification document such as a state-issued driver's license. The input means 12 can also include a means to capture biometric data from an individual.

The input means 12 is coupled to a processing means 20 which is in operative association with a database 22. The processing means 20 includes a timekeeping means operable to capture chronological parameters. The processing means is coupled to a monitor display 24 and a printer 26 operable to generate an access pass 28. The entry station can include a network connection 30 for on-line communication with a plurality internal locations within the facility. In the preferred embodiment, the generating of an access pass must be authorized by authorization means 21.

Figure 2A:
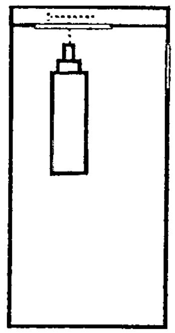
FIGS. 2*a* and 2*b* illustrate an example of a digital imaging unit for an access control system according to a preferred embodiment of the invention.
Figure 2B:
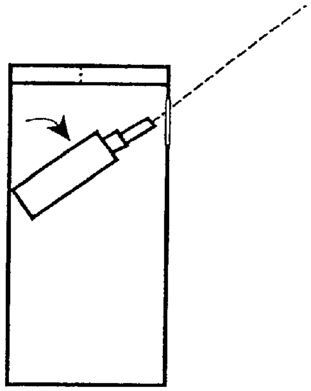

The digital imaging unit 35 can be any device operable to record digital images of an identification document and the person bearing the identification document. The digital imaging unit 35 preferably includes at least one digital camera. An digital imaging unit 35 according to a preferred embodiment of the present invention is illustrated in FIGS. 2*a* and 2*b* which includes an camera 33, preferably an autofocus camera. The camera 33 is preferably fully enclosed within housing 36 so as to obscure the camera 33 from view. It should be noted that the configuration of housing 36 as shown in FIGS. 2*a* and 2*b* is for illustrative purposes only, and that the housing 36 can have any suitable configuration in accordance with the invention. The camera 33 preferably includes a motor driven lens adjustable between a plurality of positions, a shutter mechanism, a adjustable aperture, a camera control processor, a flash, a lens driving motor and a range finding device to set the focus position. The camera 33 is preferably mounted to allow for pivotal motion. The individual elements of the camera 33 are well known in the art and need not be discussed in detail.

Figure 3:
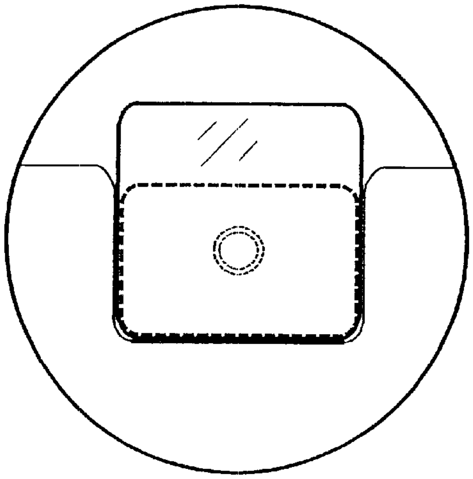
FIGS. 3 is a top view of the digital imaging unit shown in FIGS. 2*a* and 2*b;*

The digital imaging unit 35 is preferably operable to record a digital image of a document in a first plane of focus and a digital image of a person in a second plane of focus. The camera 33 is operable to pivot from a first, substantially vertical position to photograph the identification document (shown in FIG. 2*a*) to a second, outwardly directed position (shown in FIG. 2*b*) to photograph a person. As seen most clearly in the top view shown in FIG. 3, the housing 36 includes a first window 39 to receive a document to be digitally imaged. The housing includes a second window 41 positioned to be substantially aligned with the second, outwardly directed position of the camera 33. The first window 39 is preferably a solid, planar surface constructed of glass or plexiglass or the like which can receive a document to be digitally imaged. The second window 41 can be an opening in the housing 36, or can be constructed of glass or plexiglass.

The housing 36 preferably includes a document receptacle 41 adapted to receive identification documents and position the identification documents on the first window 39. The document receptacle 41 preferably includes edge guides that ensures that the identification document is correctly aligned with the lens 38. In the system of the present invention, the preferred identification document is an identification card such as a drivers license. The identification document can also be a business card, passport, or other document which can authenticate the identity of the individual. In the practice of the invention, the identification document is preferably a form of photo identification. In the preferred embodiment, the document receptacle 41 can be dimensioned to receive a standard card-type ID document and position it in front of the lens.

In FIG. 2*a*, an identification document 43 has been inserted into document receptacle 41 in a face down position. A digital image of the identification document 43 can then be recorded by the camera 33 in the first, vertical position. The camera 33 then pivots to the second, outwardly directed position so that the lens 38 is directed towards a person 51 positioned substantially in front of the digital imaging unit 35. It will be noted that the geometry of the housing and the placement of the camera 33 within the housing 36 ensures that a person placing an identification document into document receptacle 41 will be in approximately the correct position for the camera 35 to capture a facial image of the person 51. The camera utilizes focusing methods well known in the art to adjust the focal length of lens 38, such as using an infrared signal to measure the distance. The camera 33 also uses the infrared signal to direct the lens 38 (using pan and tilt movements) towards the person 51.

To capture a digital image of the identification document 43, the lens 38 is preferably automatically adjusted to preset focal length such that the plane of focus is substantially coincident with the surface of window 39. The preset focal length allows the lens 38 to focus on the focus on the identification document 43 The shutter speed, aperture opening are preferably preset so that an optimal digital image of the identification document is captured. The housing 36 can include an internal lamp 45 to illuminate the identification document 43.

In conjunction with the capture of the digital images as described above, alphanumeric identification data can be entered via a keyboard, touchscreen, or magnetic strip reader. The alphanumeric identification data preferably includes the name of the individual, and can also include additional information such as the individual's company affiliation and residential address and other miscellaneous data as might be relevant.

Figure 4:
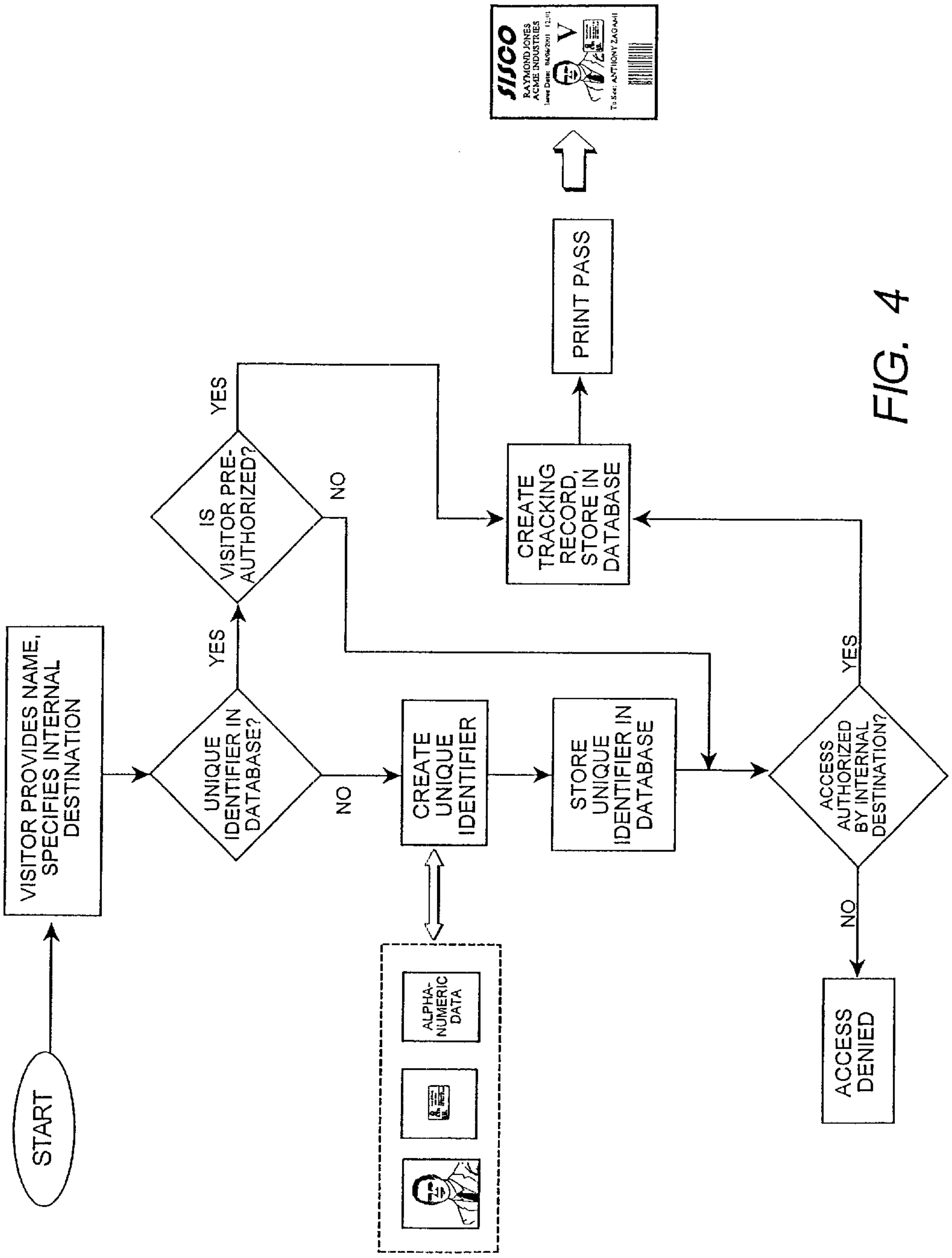
FIG. 4 is a flow chart illustrating the steps to create an access pass according to a preferred embodiment of the invention.

FIG. 4 illustrates the operative steps 60 for issuing an access pass to a visitor seeking admittance to a restricted facility according to a preferred embodiment of the invention. In step 61, a visitor seeking access to a facility provides their name to an attendant at an entry station 10. The visitor can also be required to specify an internal destination within the facility. Using the name of the individual, the database is queried 62 to determine if a unique identifier has previously been established for the individual. If no match is found, a unique identifier is created for the visitor 63. The unique identifier 64 includes the digital image of the person, a digital image of the identification document, and associated alphanumeric text which are captured in the manner described above. The unique identifier is then stored in binary form in the database 65.

The database preferably includes a plurality of predetermined internal destinations within the facility such as a specific floor or department, or a specific employee within the facility. The predetermined internal destination can be selected from the database station using the display means in combination with the touch screen, keyboard, or pointing device.

In the practice of the invention, an access pass is issued to a visitor only after authorization for visitor access is obtained. Access authorization is preferably obtained directly from the internal destination. Approval for access and the issuance of an access pass is preferably accomplished by the authorization means coupled to the processor. The authorization means can be manually implemented, such as by an attendant contacting the internal destination via internal communication means. The authorization means can also be integrated into the system of the invention and the internal communication medium of the facility so that the internal destination is automatically contacted.

Referring again to FIG. 4, in step 66 the specified internal destination is contacted to obtain authorization to admit the visitor. If authorization is either negative or inconclusive, access is denied 67. If authorization is positive, a tracking record 68 is created for the visitor, and stored in the database in binary form. The tracking record initially includes the entry time and date of the visitor, and the internal destination. When the visitor exits the facility, the exit time can be added to the tracking record. Internal tracking information can also be included in the tracking record to document the visitor's travels through the facility. An access pass is then printed in step 69.

For frequent visitors, access to the facility may be pre-authorized, and the visitor need not provide identification documents and a photographic image. To pre-authorize the visitor, an access permission designator associated with a unique identifier can be stored in the database. The access permission designator can be positive, in which case an access pass is automatically printed and the visitor is admitted. Due to rising concerns over workplace violence, it may desirable that specific individuals be denied entry into a facility. Accordingly, the database can include a negative access permission designator associated with a unique identifier to deny entry to an individual. If such an individual attempts to gain access to the facility, the database query in step 62 retrieves the deny entry instructions, and an access pass will not be issued. The access permission designator can also grant selective access to certain areas of a facility.

If a unique identifier for a visitor is already stored in the database, the database is again queried to determine if the visitor is pre-authorized 70. If a visitor is not pre-authorized, the specified internal destination is contacted to obtain authorization, and is either approved or denied for access as previously described. In the event the access permission designator indicates that the visitor is pre-authorized, a tracking record is created 68, and an access pass is printed in step 69. If the access permission designator grants selective access, a visitor may be limited to certain specified internal destinations, such as a particular floor or department.

Figure 5:
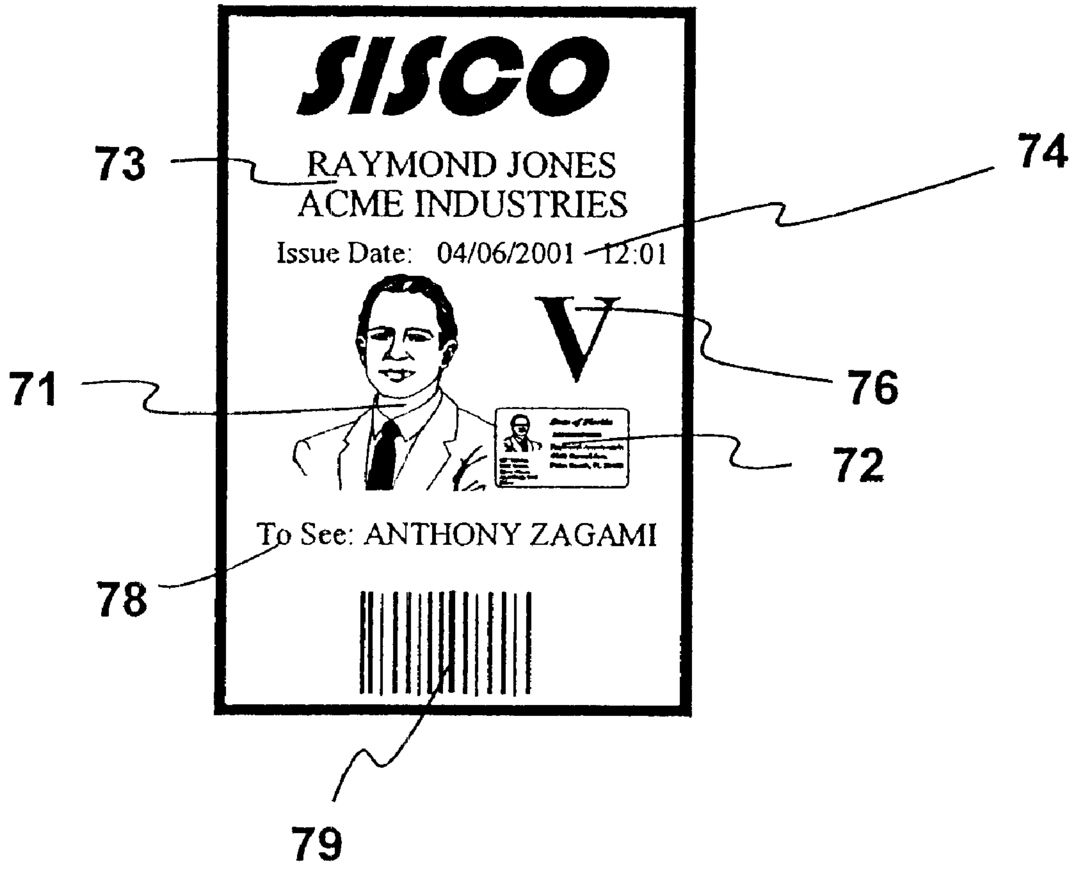
FIG. 5 is an example of an access pass generated by the system of the invention according to a preferred embodiment.

An example of an access pass 70 according to a preferred embodiment is shown in FIG. 5. The illustrated access pass 70 is only an example of the form of the access pass according to the invention, and the invention is not limited in this regard. The access pass 70 can be printed as a adhesive badge which the visitor can affix to their clothing for ready identification. The access pass 70 can also be in the form of a card which can be inserted into a standard plastic sleeve badge, or printed as a plastic card.

The access pass 70 preferably includes the digital image of the individual in combination with a digital image of the identification: document 72. The individual's name 73 (and company affiliation if applicable) are preferably printed on the pass. The date and time of entry 74 can be printed on the pass to prevent unauthorized re-use of the pass. The internal destination 78 can be printed on the pass so that it can be readily determined if the visitor is in an authorized area. Individuals can also be categorized, such as "visitors," "contractor," "temporary employees," "vendors," "maintenance" or the like. Accordingly, the pass can include a category designation 76 for prompt visual recognition.

The access pass 70 can also include machine-readable media 79. The machine-readable media 79 can be a bar code (as shown) or a magnetic strip. The machine-readable media 79 is preferably a coded representation of the unique identifier. When the machine-readable media is read by a sensing mechanism, such as an omni-directional bar code reader, the unique identifier and other relevant information can be displayed. The machine-readable media 79 can include the unique identifier in its entirety so that the unique identifier can be read independent of the database. Alternatively, the machine-readable media can be associated with the unique identifier in the database. The system of the invention can include a sensing mechanism at various checkpoints in the facility to track the visitor's travel path through the facility. The sensing mechanism can be coupled to a display monitor so that for visual verification of the identity of the visitor. A sensing mechanism can be positioned at an exit point to record the time of the visitor's exit.

In the preferred embodiments, the system can produce reports documenting visitor activity. For example, the database can be queried to determine how many visitors are in the facility at any given time. It is also possible to determine if a specific individual is within the facility, or to obtain a report documenting a specific individual's visitation history within a specified interval of time. A report could also be produced which documents visitor activity with respect to a specific visitor destination. The system of the invention is particularly useful for documenting attendance time for temporary employees for payroll purposes.

Using a networked configuration, the database can be accessed remotely via external communications means such as by satellite or the Internet. Using the system of the invention, the whereabouts of a specific individual could be determined from a location outside the facility. This also permits the generation of activity reports at locations outside the facility. It is preferably that all information stored in the database be encrypted to prevent unauthorized access.

The access control system of the present invention can be integrated with devices for physical access control such as metal detectors, doors, locking mechanisms, portals, turnstiles, and biometric devices. In this way, approval or denial of access for an individual can be physically implemented. Physical access control devices can also serve to restrict an individual bearing an access pass to certain areas in the facility, such as a specific floor.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

I claim:

1. An access control system for monitoring human ingress and egress, comprising:

input means for creating a unique identifier for a person, comprising:

a digital imaging unit, said digital imaging unit comprising:

at least one camera, said camera operable to record a digital image of a pre-issued identification document for the person in a first plane of focus and a digital image of a person; and a housing, said housing including a transparent planar surface for receiving said identification document to be recorded; and means for inputting alphanumeric identification data associated with the person, wherein the combination of the digital image of the person, digital image of the identification document and alphanumeric identification data form the unique identifier;

a database;

processing means coupled to said input means, said processing means including timekeeping means operable to record chronological parameters; said processing means operable to perform the steps of storing said unique identifier as a computer-readable file in said database, recording the arrival date and time of a person; creating a tracking record associated with said unique identifier wherein said tracking record includes said chronological parameters;

electronic display means coupled to said processing means operable to display said unique identifier;

printing means; and an access pass on portable media, the access pass comprising at least a portion of the unique identifier wherein the access pass includes a viewable image of the person and alphanumeric identification data for the person.

2. The system of claim 1, wherein said access pass further comprises a viewable image of the identification document.

3. The system of claim 1, wherein said access pass further includes said arrival date and time in human-readable form.

4. The system of claim 1, wherein said access pass further comprises machine-readable media, wherein said machine-readable media comprises a coded representation of said unique identifier.

5. The system of claim 4, wherein said machine-readable media further comprises a coded representation of said arrival date and time.

6. The system of claim 1, further comprising at least one sensing mechanism coupled to said processing means operable to interpret said machine-readable media.

7. The system of claim 4, wherein said database further comprises a listing of a plurality predetermined internal destinations within the facility, wherein at least one of said internal destinations are specified by the person at the time of ingress.

8. The system of claim 7, wherein said tracking record further comprises the internal destination of the person.

9. The system of claim 3, further comprising authorization means coupled to said processing means, wherein said authorization means is operable to issue said access pass at the point of ingress after obtaining positive authorization.

10. The system of claim 9, wherein said authorization means is operable to issue said access pass after obtaining positive authorization from said specified internal destination.

11. The system of claim 1, wherein said processing means is operable to perform the steps of storing an access permission designator in said database in association with said unique identifier and querying said database to retrieve said access permission designator.

12. The system of claim 11, wherein said access permission designator is positive, and said processing means is operable to perform the step of issuing said access pass.

13. The system of claim 11, wherein said access permission designator is negative.

14. The system of claim 11, wherein said access permission designator permits selective access to at least one internal destination.

15. The system of claim 7, wherein said access pass further comprises said internal destination in human-readable format.

16. The system of claim 1, wherein said machine-readable media comprises said computer-readable file corresponding to said unique identifier.

17. The system of claim 1, wherein said machine-readable media is associated with said unique identifier in said database.

18. The system of claim 6, further wherein said at least one sensing mechanism is located at point of exit from the facility.

19. The system of claim 1, wherein said processing means is further operable to perform the steps of recording a time of exit of the person and storing said time of exit in said tracking record.

20. The system of claim 4, wherein said machine-readable media is a bar code.

21. The system of claim 20, wherein the sensing mechanism is an omnidirectional bar-code reader.

22. The system of claim 4, wherein the machine-readable media is a magnetic strip.

23. The system of claim 22, wherein said sensing mechanism is a magnetic strip reader.

24. The system of claim 1, wherein the means for inputting alphanumeric identification data is a keyboard.

25. The system of claim 1, wherein the means for inputting alphanumeric identification data is a touchscreen.

26. The system of claim 1, wherein the identification document is a driver's license.

27. The system of claim 1, wherein the identification document is a business card.

28. The system of claim 1, wherein the means for inputting alphanumeric data is a magnetic strip reader.

29. The system of claim 1, wherein said access pass comprises an adhesive backed badge worn on the person.

30. The system of claim 1, wherein said access pass comprises a card.

31. The system of claim 1, wherein said computer-readable file is encrypted.

32. The system of claim 1, wherein said tracking record is encrypted.

33. The system of claim 1, wherein said alphanumeric identification data comprises the name of the person.

34. The system of claim 1, wherein said alphanumeric identification data comprises the company affiliation of the person.

35. The system of claim 1, wherein said alphanumeric identification data comprises a categorical designation for the person.

36. The system of claim 1, wherein said at least one camera comprises an autofocus camera, said autofocus camera including a lens adjustable between a plurality of positions, said autofocus camera operable to record a digital image of a pre-issued identification document for the person in a first plane of focus and a digital image of a person and in a second plane of focus.

37. The system of claim 2, wherein said housing includes a transparent planar surface for receiving said identification document to be recorded wherein said transparent planar surface is coincident with said first plane of focus.

38. A computer-implemented method for monitoring human ingress and egress, comprising the steps of:

creating a unique identifier for a person seeking to enter a facility, the unique identifier comprising a digital image of the person, a digital image of an identification document of the person, and alphanumeric identification data for the person;

providing an autofocus camera, the autofocus camera operable to record a digital image of a person and in a first plane of focus and a digital image of an identification document for the person in a second plane of focus, the autofocus camera including a planar surface for receiving the identification document to be recorded wherein the planar surface is coincident with the second plane of focus; and recording the arrival time of the person;

specifying the internal destination of the person within the facility;

obtaining authorization from the internal destination for entry of the person;

creating a tracking record comprising the unique identifier in association with the arrival time and internal destination;

providing a database to store the unique identifier and the tracking record;

providing a printing means; and providing an access pass on portable media, the access pass comprising at least a portion of the unique identifier, arrival time, and internal destination in human-readable format and machine-readable media comprising a coded representation of said unique identifier.

39. The method of claim 38, further comprising the steps of providing a sensing mechanism operable to interpret the machine readable media at a point of egress, querying the database to retrieve said unique identifier;

recording the exit time of a person, and saving the exit time in the tracking record.

40. The method of claim 38, further comprising the step of providing a keyboard to input alphanumeric identification data.

41. The method of claim 38, further comprising the step of providing a touchscreen to input alphanumeric identification data.

42. The method of claim 38, further comprising the step of providing a magnetic strip reader to input alphanumeric identification data.

43. The method of claim 38, further comprising the step of:

providing a list of predetermined internal destinations; and selecting a predetermined internal destination.

44. The method of claim 31, wherein said alphanumeric identification data comprises the name of the person.

45. The method of claim 38, wherein said alphanumeric identification data comprises the company represented by of the person.

46. The method of claim 38, wherein said identification document is a drivers license.

47. The method of claim 38, wherein said identification document is a business card.

48. The method of claim 38, wherein said identification document is a passport.

49. The method of claim 38, wherein said machine-readable media is a bar code.

50. The method of claim 39 wherein the sensing mechanism is an omnidirectional bar-code reader.

51. The method of claim 38, wherein the machine-readable media is a magnetic strip.

52. The method of claim 46, wherein said sensing mechanism is a magnetic strip reader.

* * * * *